(12) United States Patent  
Bullock

(10) Patent No.: US 9,090,194 B1
(45) Date of Patent: Jul. 28, 2015

(54) DETACHABLY-SPLICED LOAD RESTRAINT STRIPS

(71) Applicant: Matthew Bullock, McLean, VA (US)

(72) Inventor: Matthew Bullock, McLean, VA (US)

(*) Notice: Subject to any disclaimer, the term of this patent is extended or adjusted under 35 U.S.C. 154(b) by 0 days.

(21) Appl. No.: 14/463,352

(22) Filed: Aug. 19, 2014

(51) Int. Cl.
*B60P 7/08* (2006.01)
*B60P 7/10* (2006.01)

(52) U.S. Cl.
CPC *B60P 7/0823* (2013.01); *B60P 7/10* (2013.01)

(58) Field of Classification Search
CPC ............. B60P 7/0823; B60P 7/10; B60P 7/12
USPC ............. 410/32, 34, 36, 42, 96, 97, 100, 118, 410/155; 220/1.5; 248/499; 206/410, 597; 53/399, 441, 462, 556
See application file for complete search history.

(56) References Cited

U.S. PATENT DOCUMENTS

| | | | |
|---|---|---|---|
| 3,399,635 A | 9/1968 | Heard | |
| 3,782,758 A | 1/1974 | Williamson, III | |
| 3,854,619 A | 12/1974 | Gaudy | |
| 4,264,251 A | 4/1981 | Blatt | |
| 5,139,842 A | 8/1992 | Sewell | |
| 5,747,131 A | 5/1998 | Kreckel | |
| 6,030,158 A | 2/2000 | Tatina et al. | |
| 6,089,802 A | 7/2000 | Bullock | |
| 6,109,846 A | 8/2000 | Davis et al. | |
| 6,227,779 B1 | 5/2001 | Bullock | |
| 6,368,036 B1 * | 4/2002 | Vario | 410/98 |
| 6,607,337 B1 | 8/2003 | Bullock | |
| 6,755,232 B1 | 6/2004 | Holland et al. | |
| 6,767,169 B2 | 7/2004 | Zhan et al. | |
| 6,896,459 B1 | 5/2005 | Bullock | |
| 6,923,609 B2 | 8/2005 | Bullock | |
| 6,981,827 B2 | 1/2006 | Bullock | |
| 6,981,828 B2 | 1/2006 | Davies et al. | |
| 7,018,151 B2 | 3/2006 | Bullock | |
| 7,066,698 B2 | 6/2006 | Bullock | |
| 7,103,941 B2 | 9/2006 | Vick | |
| 7,290,969 B2 | 11/2007 | Bullock | |
| 7,329,074 B2 | 2/2008 | Bullock | |
| 8,113,752 B2 | 2/2012 | Bullock | |
| 8,128,324 B2 | 3/2012 | Bullock | |
| 8,142,102 B2 | 3/2012 | Wheatley | |
| 8,322,956 B2 | 12/2012 | Strang et al. | |
| 8,403,607 B1 | 3/2013 | Bullock | |
| 8,403,608 B1 | 3/2013 | Bullock | |

(Continued)

FOREIGN PATENT DOCUMENTS

EP 1184436 A1 3/2002
WO 9301979 A1 2/1993

OTHER PUBLICATIONS

"KT Tape" downloaded from <http://www.athletictapeinfo.com/category/kinesiology-tape-information/> on or before Jul. 25, 2014.

(Continued)

*Primary Examiner* — Stephen Gordon
(74) *Attorney, Agent, or Firm* — Banner & Witcoff, Ltd.

(57) ABSTRACT

A set of load restraint strips may be detachably joined by splice panels. Each of the load restraint strips may include a base layer comprising a base layer material, a reinforcement layer comprising a reinforcing material fixed relative to the base layer material, and an attachment layer comprising an adhesive material layer extending less than an entire length of the load restraint strip.

20 Claims, 9 Drawing Sheets

(56) References Cited

U.S. PATENT DOCUMENTS

| | | |
|---|---|---|
| 8,403,609 B1 | 3/2013 | Bullock |
| 8,408,852 B1 | 4/2013 | Bullock |
| 8,419,329 B1 | 4/2013 | Bullock |
| 2005/0249568 A1 | 11/2005 | Gormly et al. |
| 2009/0314673 A1 | 12/2009 | Richins et al. |
| 2014/0007389 A1 | 1/2014 | Leung |
| 2014/0107554 A1 | 4/2014 | Bushby |

OTHER PUBLICATIONS

"Decal Grip" downloaded from <http://www.preimertactical.com/p-56592-decal-grip-g17fg-glock-sandblack-aspx> on or before Jul. 25, 2014.

U.S. Appl. No. 13/959,879, filed Aug. 6, 2013.

\* cited by examiner

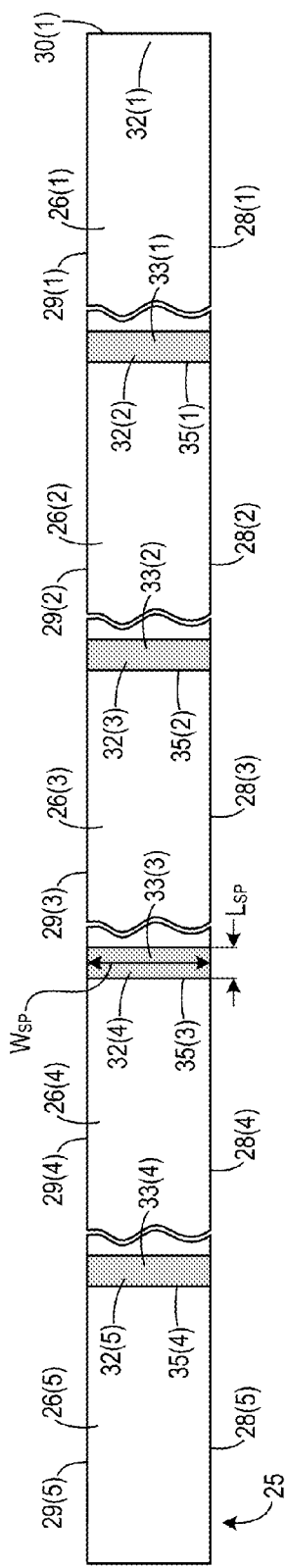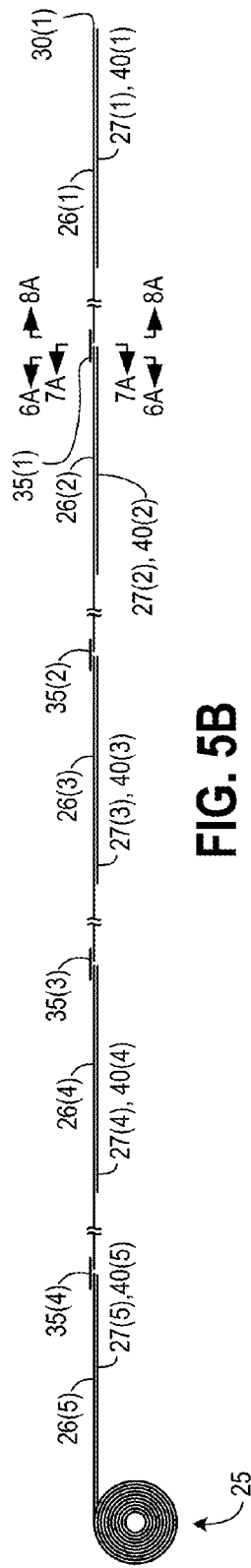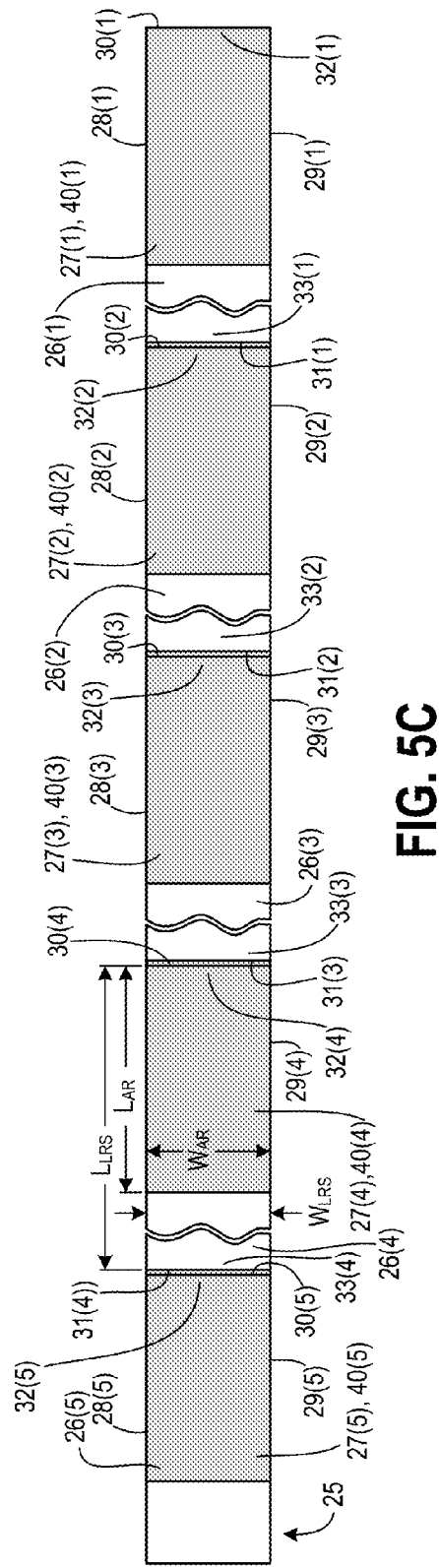

DETACHABLY-SPLICED LOAD RESTRAINT STRIPS

BACKGROUND

Intermodal containers are commonly used when shipping goods domestically and/or internationally. Such containers can be loaded onto cargo ships for transport across oceans or other bodies of water. For land transport, these containers can be placed onto a trailer and then hauled overland by truck. Such containers can also be loaded onto railroad flatcars for transport.

Shipping containers can be loaded with boxes, crates, drums, reinforced bags, plastic wrapped bundles, cased goods, metal coils, specialty heavy paper rolls, plastic or metal containers mounted on pallets, and/or numerous other forms of cargo. Maritime and surface transportation regulations require that such loads be restrained from lateral shifting. In particular, a shipping container may experience significant movement as the container is carried by an ocean vessel or by another conveyance. If cargo within the intermodal container is not restrained, it may shift and collide with a container wall or container doors. Because the mass of cargo in a container can be significant, such shifting and/or collisions can have catastrophic consequences for transport workers and for the public at large. For example, shifting cargo can be damaged when colliding with a container wall and/or be crushed by other shifting cargo. Damaged cargo can lead to release of product, which product may be toxic or otherwise be hazardous. As another example, shifting cargo might alter the center of gravity of the shipping container itself and thereby cause significant problems for the ship, truck or other vehicle carrying the container.

FIG. 1 illustrates a known technique for restraining cargo within a shipping container 1. A portion of a top 3 and right side wall 2R have been cut away from container 1 to reveal cargo loaded therein. In the example of FIG. 1, the cargo includes a load of crates 4 and drums 5. FIG. 1 further shows a portion of an interior of a left side wall 2L. Crates 4 and drums 5 are secured against movement toward the rear 11 of container 1 by a restraint system that includes multiple load restraint strips 6. Each load restraint strip 6 is flexible and has an adhesive-coated region 7. A region 7a of a first strip 6a is pressed against an interior surface of side wall 2R. The other end 8a of load restraint strip 6a is then wrapped around the rear of a portion of crates 4. Strip region 7a and other load restraint strip regions in FIG. 1 are stippled to indicate the presence of adhesive.

A second load restraint strip 6b is similar to load restraint strip 6a and has an adhesive-coated region (not shown) similar to region 7a of load restraint strip 6a. The adhesive-coated region of load restraint strip 6b is secured to the interior surface of side wall 2L in a position that is at generally the same height as region 7a. The end 8b of load restraint strip 6b is then wrapped around the rear of the portion of crates 4 similar to end 8a. Ends 8a and 8b are then tightened, e.g., using a tool and method such as is described in U.S. Pat. No. 6,981,827. An adhesive-backed patch 9 is then applied over the tightened ends 8a and 8b to secure those ends together. In a similar manner, load restraint strips 6c and 6d and other pairs of load restraint strips 6 are used to secure crates 4 and drums 5 from lateral movement.

Load restraint strips may be supplied in roll form. FIG. 2A shows a roll 15 that includes multiple load restraint strips 6 such as those indicated in FIG. 1. One of those load restraint strips has been unrolled and is identified as 6(1). The next load restraint strip on roll 15 is indicated as 6(2). Each load restraint strips 6 is approximately 12 feet in length. In the configuration of FIG. 2A, the attachment region 7 of each load restraint strip 6 is located on the side of the load restraint strip facing the interior of roll 15 and may be covered with a removable liner made from silicone-backed release paper or similar material. Locations of regions 7(1) and 7(2) on the other sides of load restraint strips 6(1) and 6(2), respectively, are indicated with broken lines.

Load restraint strips 6 in roll 15 are continuous. In particular, and except with regard to regions 7 and liners covering regions 7, the backing material, reinforcing material and other components that form load restraint strips 6 extend continuously and unbroken across the boundaries between load restraint strips. As a result, and as indicated in FIG. 2B, each load restraint strip 6 must be cut from roll 15 using scissors or some other type of cutting tool.

Cutting each load restraint strip 6 from roll 15 presents several issues. For example, each cutting operation requires that a worker identify the boundary between two load restraint strips 6 and then sever one of those load restraint strips from the roll by cutting along that boundary. Although the incremental time to perform this operation for one load restraint strip may seem relatively short, these increments accumulate. Intermodal containers are often loaded and prepared for transport on a large scale, and even small delays can significantly affect throughput of cargo through a loading facility.

Many types of rolled products include perforations separating adjacent products on the roll. These perforations may then allow a single product to be torn away without use of a separate cutting tool. For many types of load restraint strips, however, this is a less-than-ideal solution. In order to provide adequate cargo-holding strength, load restraint strips typically incorporate some type of reinforcing material. For many types of reinforcing materials, perforating the boundary between load restraint strips is not practical.

SUMMARY

This Summary is provided to introduce a selection of concepts in a simplified form that are further described below in the Detailed Description. This Summary is not intended to identify key features or essential features of the invention.

In some embodiments, an article of manufacture may comprise a set of detachably-spliced load restraint strips. Each of the load restraint strips may include a base layer comprising a base layer material, a reinforcement layer comprising a fibrous reinforcing material fixed relative to the base layer material and discontinuous from the fibrous reinforcing materials of the other load restraint strips, and an attachment layer comprising an adhesive material layer extending less than an entire length of the load restraint strip. The article of manufacture may further comprise a plurality of splice panels. Each of the splice panels may comprise a flexible backing and a releasable adhesive. Each of the splice panels may join a pair of the multiple load restraint strips different from pairs of the multiple load restraint strips joined by other splice panels of the plurality.

In some additional embodiments, an article of manufacture may comprise a set of load restraint strips. Each of the load restraint strips may include first and second end edges and first and second side edges extending between the first and second end edges. Each of the load restraint strips may further include a base layer comprising a base layer material, a reinforcement layer comprising a fibrous reinforcing material, and an attachment layer comprising an adhesive material layer and release liner extending less than an entire length of the load restraint strip. The article of manufacture may additionally comprise a plurality of splice panels. Each of the splice panels may join a pair of load restraint strips from the set. The pair of load restraint strips joined by each of the splice panels may be different from each of the pairs of load restraint strips joined by the other splice panels. Each of the splice panels may comprise a flexible backing and a releasable adhesive contacting the pair of load restraint strips joined by that splice panel.

In some further embodiments, an article of manufacture may comprise a set of load restraint strips. Each of the load restraint strips may have a first side and a second side and may include a base layer comprising a base layer material, a reinforcement layer comprising a reinforcing material different from the base layer material, and an attachment layer comprising an adhesive material layer and release liner, the attachment layer extending less than an entire length of the load restraint strip and located on the first side. The article of manufacture may also comprise a plurality of splice panels. Each of the splice panels may join a pair of load restraint strips from the set. The pair of load restraint strips joined by each of the splice panels may be different from each of the pairs of load restraint strips joined by the other splice panels. Each of the splice panels may comprise a flexible backing and a releasable adhesive contacting the second sides of the load restraint strips of the pair of load restraint strips joined by that splice panel.

Additional embodiments are described herein.

BRIEF DESCRIPTION OF THE DRAWINGS

Some embodiments are illustrated by way of example, and not by way of limitation, in the figures of the accompanying drawings and in which like reference numerals refer to similar elements.

FIG. 5A is a partially schematic top view of the load restraint strips from FIG. 3A, but in a different configuration.

FIG. 5B is a partially schematic side view of the load restraint strips of FIG. 5A.

FIG. 5C is a partially schematic bottom view of the load restraint strips of FIG. 5A.

DETAILED DESCRIPTION

Figure 3A:
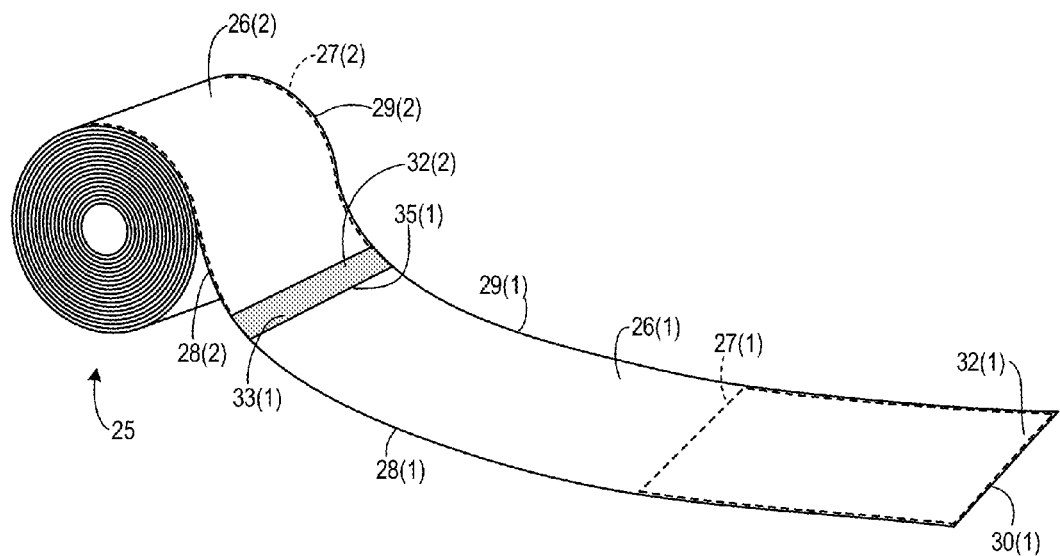
FIG. 3A shows multiple load restraint strips, according to some embodiments, that are detachably spliced together.

In at least some embodiments, a set of multiple load restraint strips are detachably spliced together. Material components of the load restraint strips are discontinuous across transitions between adjacent load restraint strips. At each transition, a removably-adhered splice panel may join an end of one load restraint strip to an end of another load restraint strip and may extend across end edges of the joined load restraint strips. The splice panel can be quickly identified and removed, without use of tools, to separate one of the load restraint strips from other load restraint strips in the set. FIG. 3A shows a set of multiple load restraint strips according to one such embodiment. In the embodiment of FIG. 3A, the multiple load restraint strips are wound into a roll 25. In other embodiments, and as discussed herein, a set of detachably-spliced load restraint strips may be packaged and/or arranged differently.

Where appropriate, reference numbers in the drawings include appended parentheticals to distinguish between specific load restraint strips. In FIG. 3A, for example, a load restraint strip 26(1) has been unrolled from roll 25 and a portion of a rolled load restraint strip 26(2) is also visible. Those load restraint strips, and other like load restraint strips 26(3) through 26(n) described below, will be referenced collectively and/or generically using the same reference number 26, but without an appended parenthetical. A similar numbering convention is used for splice panels (described below) and for elements of individual load restraint strips 26 and for elements of individual splice panels.

Each load restraint strip 26 includes an attachment region 27 that includes a container wall adhesive. When a load restraint strip 26 is put into use, that container wall adhesive may be pressed into contact with a wall of a shipping container. In the embodiment of roll 25, each attachment region 27 is located on the side of a rolled strip 26 facing toward the interior of roll 25. Because attachment regions 27 would not be exposed in the configuration of FIG. 3A, the locations of attachment regions 27(1) and 27(2) are indicated with broken lines.

Each load restraint strip 26 includes side edges 28 and 29 and end edges 30 and 31. Side edges 28(1), 29(1), 28(2) and 29(2) and end edge 30(1) are indicated in FIG. 3A. End edges 31(1) and 30(2) are visible in FIG. 3B. Each load restraint strip 26 also has an end 32 and an end 33. As used herein, an "end" of a load restraint strip is a region proximate to and including an end edge of that load restraint strip. As indicated in FIG. 3A, for example, end 32(1) is the region of strip 26(1) that is near and includes end edge 30(1).

The multiple load restraint strips 26 in FIG. 3A include n load restraint strips 26(1) through 26(n). Except for the general representation of side edges 28 as windings of roll 25, load restraint strips 26(3) through 26(n) are not visible in FIG. 3A. The value of n can be any integer greater than or equal to 2. In various embodiments, n may have a value greater than or equal to 10, greater than or equal to 20, greater than or equal to 30, greater than or equal to 40, greater than or equal to 50, etc.

Figure 1:
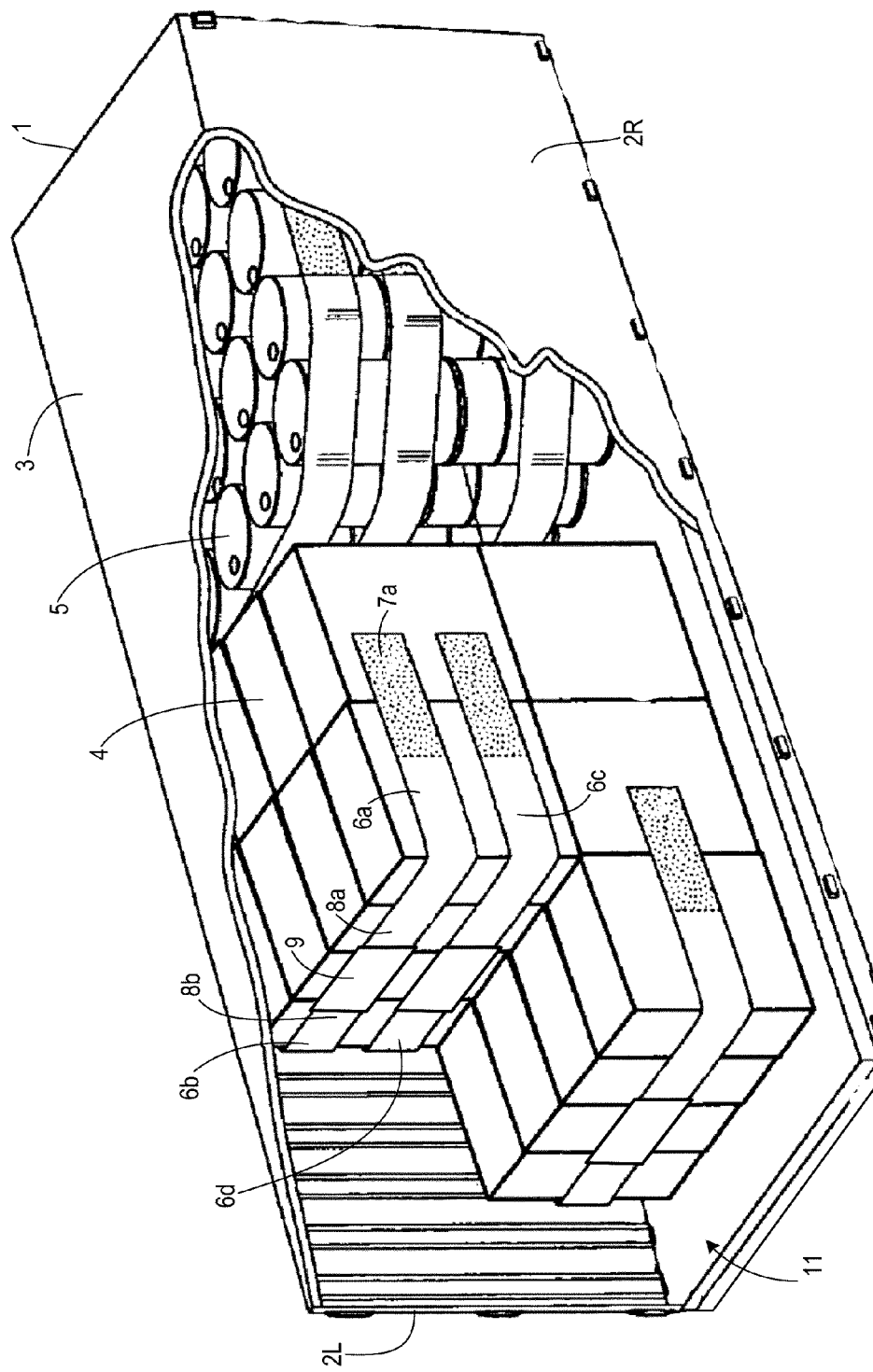
FIG. 1 illustrates a technique for restraining cargo within a shipping container.
Figure 2A:
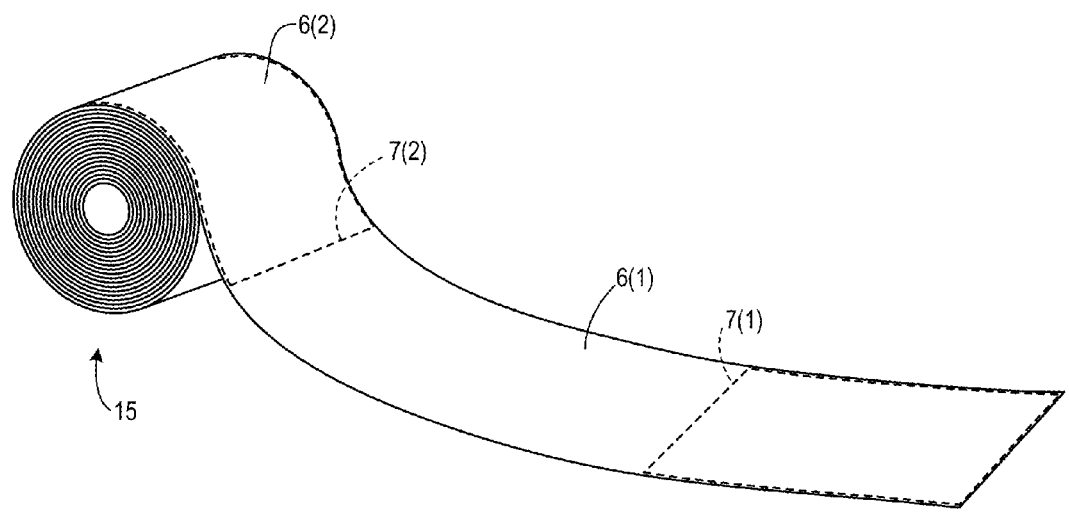
FIG. 2A shows a roll that includes multiple load restraint strips such as those indicated in FIG. 1.
Figure 2B:
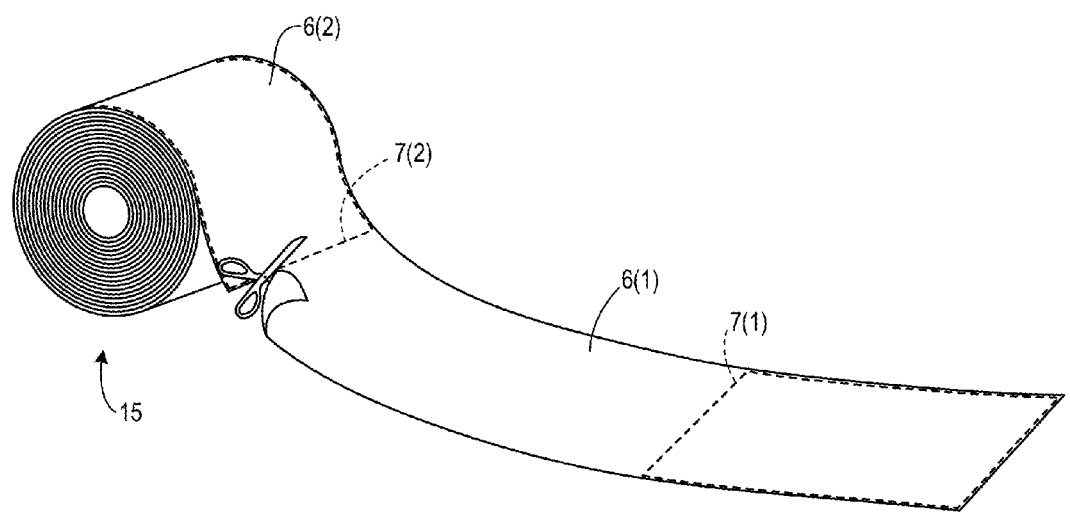
FIG. 2B shows removal of a load restraint strip from the roll of FIG. 2A.

Unlike load restraint strips 6 on roll 15 in FIGS. 2A and 2B, load restraint strips 26 on roll 25 are connected by splice panels 35. In particular, and except for load restraint strip 26(n), the end 33 of each load restraint strip 26 is connected to the end 32 of the next load restraint strip 26 on roll 25. As indicated in FIG. 3A, for example, splice panel 35(1) joins end 33(1) of load restraint strip 26(1) to end 32(2) of load restraint strip 26(2).

Figure 3B:
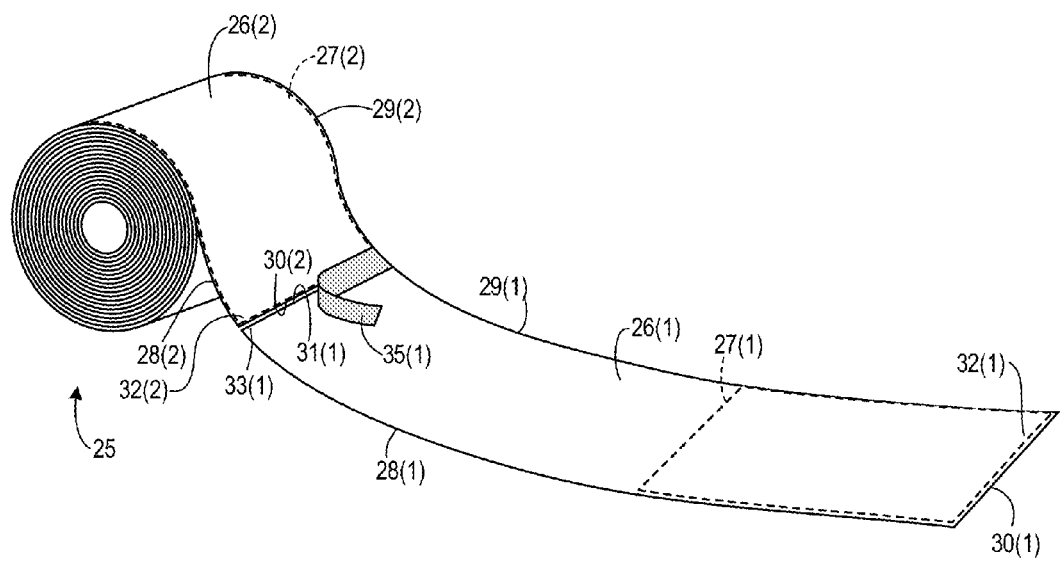
FIG. 3B shows removal of a load restraint strip from the roll of FIG. 3A.

FIG. 3B shows load restraint strips 26 after a portion of splice panel 35(1) has been peeled away. As indicated in FIG. 3B, there is an interruption between the materials at end edge 31(1) of load restraint strip 26(1) and the materials at end edge 30(2) of load restraint strip 26(2). As a result, the materials of load restraint strip 26(1) do not extend continuously across the transition between load restraint strips 26(1) and 26(2). Upon complete removal of panel 35(1), load restraint strip 26(1) will no longer be connected to other load restraint strips 26 on roll 25. As explained further below, other load restraint strips 26 on roll 25 are joined in a similar manner by other splice panels 35.

In some embodiments, each splice panel in a set of detachably-spliced load restraint strips joins a pair of load restraint strips that is different from each of the pairs of load restraint strips joined by other splice panels. For example, splice panel 35(1) joins the pair of load restraint strips 26(1) and 26(2), splice panel 35(2) joins the pair of load restraint strips 26(2) and 26(3) (see FIGS. 5A through 5C), etc. This can be generally stated as follows: for k=1 to n, where n is the number of load restraint strips 26 in a set of detachably-spliced load restraint strips 26 that includes n−1 splice panels 35, each splice panel 35($k$) is attached to and joins the pair of load restraint strips 26($k$) and 26($k$+1).

Figure 4A:
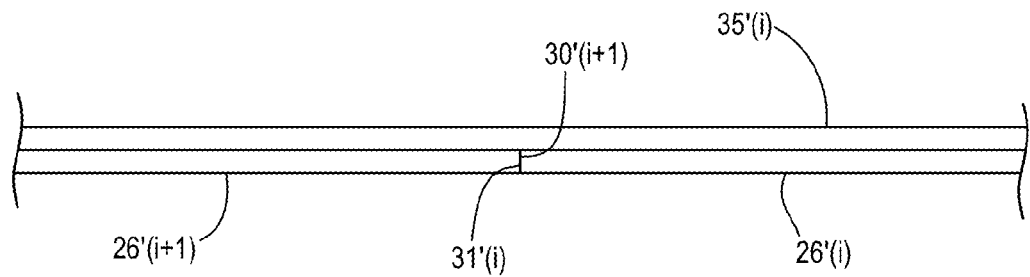
FIGS. 4A and 4B are partially schematic side edge views of detachably spliced load restraint strip ends according to some embodiments.

For simplicity, the interruptions between materials at joined ends of load restraint strips 26, and resultant discontinuities between such materials across transitions between joined load restraint strips 26, are depicted as gaps in FIG. 3B and in subsequent drawing figures. In some embodiments, however, such an interruption may not include a gap as depicted in FIG. 3B. For example, FIG. 4A is a partially schematic side view representing portions of load restraint strips 26'($i$) and 26'($i$+1) and splice panel 35'($i$), where 1≤i<n and n is a number of detachably-spliced load restraint strips in a set of load restraint strips 26'. Restraint strips 26' and splice panels 35' may be similar to restraint strips 26 and splice panels 35. Except as indicated in FIG. 4A, restraints strips 26' may be joined by splice panels 35' in a manner similar to that of restraint strips 26 and splice panels 35. In particular, end edge 31'($i$) of load restraint strip 26'($i$) may abut end edge 30'($i$+1) of load restraint strip 26'($i$+1). Although the materials of load restraint strip 26'($i$) may touch the materials of load restraint strip 26'($i$+1) at that abutment, those materials are not directly attached to one another.

Figure 4B:
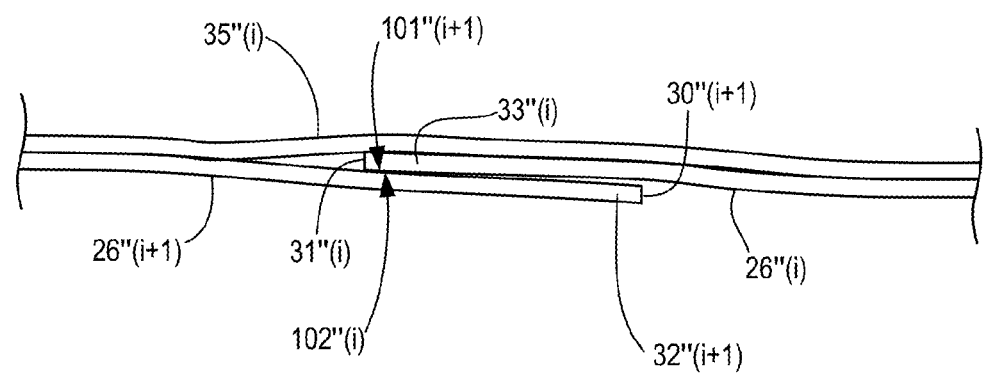

Another example of interruptions between materials at joined ends of load restraint strips is shown in FIG. 4B, a partially schematic side view representing portions of load restraint strips 26"($i$) and 26"($i$+1) and splice panel 35"($i$) in another slightly different configuration. Restraint strips 26" and splice panels 35" may be similar to restraint strips 26 and splice panels 35. Except as indicated in FIG. 4B, restraint strips 26" may be joined by splice panels 35" in a manner similar to that of restraint strips 26 and splice panels 35. In particular, and as seen in FIG. 4B, some or all of end 33"($i$) might overlap some or all of end 32"($i$+1). A portion of an upper surface 101"($i$+1) of load restraint strip 26"($i$+1) is in contact with a portion of a lower surface 102"($i$) of load restraint strip 26"($i$). However, there is no bond between those two surfaces. Accordingly, end 32"($i$+1) can be easily separated from end 33"($i$) when splice panel 35" is removed.

FIG. 5A is a top view of the set of detachably-spliced load restraint strips 26 from FIG. 3A. To further illustrate how numerous load restraint strips may be detachably spliced in an end-to-end fashion, and to show further details, FIG. 5A shows strips 26(1), 26(2), 26(3) and 26(4) fully unrolled from roll 25 and in a flattened condition. Strip 26(5) has been partially unrolled in FIG. 5A. FIG. 5B is a side view of load restraint strips 26 in the configuration of FIG. 5A. FIG. 5C is a bottom view of load restraint strips 26 in the configuration of FIG. 5A. In FIGS. 5A through 5C, parallel sets of wavy lines indicate that portions of load restraint strips 26(1) through 26(4) have been omitted from the drawings because of page size limitations. Those sets of wavy lines are not intended to represent physical interruptions in those strips 26.

As seen in FIGS. 5A and 5B, ends 33(2) and 32(3) of load restraint strips 26(2) and 26(3), respectively, are joined by splice panel 35(2). In a similar fashion, splice panel 35(3) joins respective ends 33(3) and 32(4) of load restraint strips 26(3) and 26(4), and splice panel 35(4) joins respective ends 33(4) and 32(5) of load restraint strips 26(4) and 26(5). This pattern continues for the remaining strips 26 in roll 25.

The locations of attachment regions 27(1) through 27(5) on load restraint strips 26(1) through 26(5), respectively, can be seen in FIGS. 5B and 5C. Accordingly, broken line indications of attachment regions 27 are omitted in FIG. 5A. As explained below in connection with FIG. 6B, each attachment region 27 includes a layer of container wall adhesive and a removable liner 40 that may cover the container wall adhesive until the load restraint strip is put into use. In the embodiment of FIGS. 5A through 5C, each liner 40 is coextensive with the container wall adhesive, and thus coextensive with a corresponding attachment region 27.

In some embodiments, load restraint strips 26 are identical. Each load restraint strip 26 may have a length $L_{RS}$ and a width $W_{ARS}$. As shown in FIG. 5C for load restraint strip 26(4), the length $L_{RS}$ may extend from an end edge 30 to an end edge 31 and the width $W_{LRS}$ may extend from a side edge 28 to a side edge 29. An attachment region 27 may extend the entire width $W_{LRS}$ of a load restraint strip 26, i.e., the width $W_{AR}$ of an attachment region 27 may equal the width $W_{LRS}$ of the load restraint strip. In some embodiments, a length $L_{AR}$ of an attachment region 27 may be less than the length $L_{RS}$ of the load restraint strip. An attachment region 27 may extend from an end 32 of a load restraint strip toward the end 33 of that strip, and may begin at or near an end edge 30 of that load restraint strip. In at least some embodiments $L_{RS}$ is between 9 and 14 feet (e.g., 12 feet), $W_{LRS}$ is between 10 and 20 inches (e.g., 16 inches) and $L_{AR}$ is between 2 and 6 feet (e.g., 5 feet). In some embodiments, $W_{AR}$ may be slightly less than $W_{LRS}$.

In at least some embodiments, splice panels 35 are identical and extend from edges 28 of two joined load restraint strips to edges 29 of those joined load restraint strips. Splice panels 35 may have a length $L_{SP}$ that is much less than $L_{RS}$ and $L_{AR}$. In some embodiments, for example, $L_{SP}$ is between 1 and 12 inches, e.g., between 2.5 to 6 inches. A width \N$_{SP}$ may be equal to $W_{ARS}$. In some embodiments, $W_{SP}$ may be slightly greater or less than $W_{LRS}$, e.g., $0.85W_{LRS} \leq W_{SP} \leq 1.15W_{LRS}$. As further seen in FIGS. 5A through 5C, splice panels 35 and attachment regions 27 are located on opposite sides of load restraint strips 26.

Figure 6A:
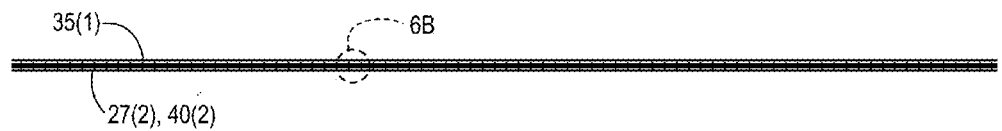
FIG. 6A is a partially schematic area cross-sectional view taken from the location indicated in FIG. 5B.
Figure 6B:
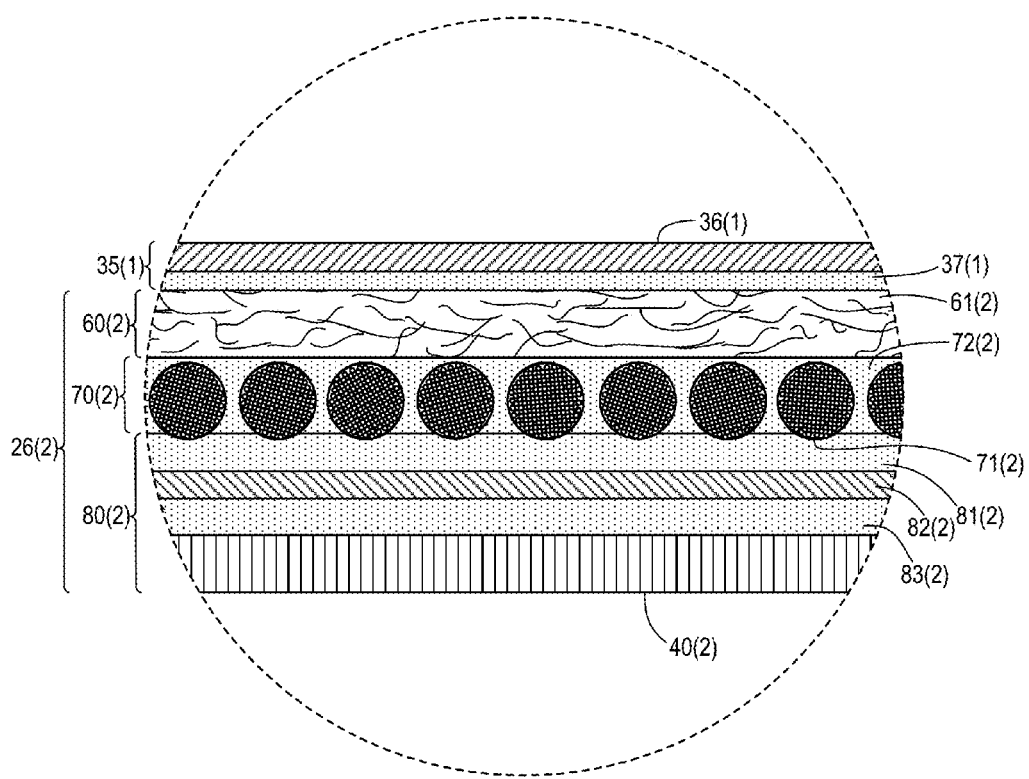
FIG. 6B is an enlargement of a part of the partially schematic area cross-sectional of FIG. 6A.

FIG. 6A is a partially schematic area cross-sectional view of load restraint strip 26(2) and splice panel 35(1) taken from the location indicated in FIG. 5B. FIG. 6B is an enlargement of a part of that partially schematic area cross-sectional view from the location indicated in FIG. 6A. As previously indicated, load restraint strips 26 may be identical, as may be splice panels 35. Accordingly, each load restraint strip 26 may have a structure identical to that described below for load restraint strip 26(2) and each splice panel 35 may have a structure identical to that described below for splice panel 35(1). Cross sectional views taken at similar locations of other load restraint strips 26 and splice panels 35 would show features like those in FIG. 6B.

As seen in FIG. 6B, load restraint strip 26(2) includes a base layer 60(2), a reinforcement layer 70(2), and an attachment layer 80(2). Base layer 60(2) and reinforcement layer 70(2) extend throughout the entire length of load restraint strip 26(2), whereas attachment layer 80(2) is confined to attachment region 27(2) (see FIGS. 5B and 5C).

Base layer 60(2) includes a band 61(2) of base layer material that may extend from end edge 30(2) to end edge 31(2) and from side edge 28(2) to side edge 29(2). In the embodiment of load restraint strips 26, band 61(2) may be a continuous piece of spun bonded polyethylene fiber material that extends the entire length $L_{LRS}$ and width $W_{LRS}$ of load restraint strip 26(2). Examples of such material includes the product sold under the trade name TYVEK. In other embodiments, another material may be used in base layer 60(2). Examples of other base layer materials include bands of other types of spun bonded polymer fibers, films of polyester, polyethylene terephthalate (e.g., such as films sold under the trade name MYLAR) or other polymers, paper, bands of woven, knitted or felted natural fibers (e.g., cotton), and bands of woven or knitted artificial fibers. In still other embodiments, multiple materials may be used in a base layer and/or a base layer may comprise multiple separate material pieces. Exemplary thicknesses for a spun bonded polyester fiber base layer 60(2) are between 8 mils and 11 mils, where 1 mil=0.001 inch=0.0254 millimeters (mm). This range is solely for purposes of example, however. Embodiments include load restraint strips in which a base layer material band has a thickness substantially outside this range.

Reinforcement layer 70(2) is fixed relative to base layer 60(2). In particular, reinforcement fibers 71(2) are bonded to a side of band 61(2) by a laminating adhesive 72(2). In some embodiments, fibers 71(2) are parallel to one another and to the length $L_{LRS}$ direction and may extend from end edge 30(2) to end edge 31(2). In some embodiments, fibers 71(2) are bundles of polymer strands having a denier (i.e., a linear mass density in grams per 9000 meters) of between about 1400 and about 1650. In some embodiments, the strands of fibers 71(2) may have a denier between about 1450 and about 1600. In certain embodiments, the strands of fibers 71(2) may have a denier between about 1479 and about 1547, with target denier of about 1513. In some embodiments, reinforcement layer 70(2) includes between about 100 and about 320 fibers 71(2) arranged across the entire width $W_{LRS}$ of load restraint strip 26(2). Exemplary materials for the strands of fibers 71(2) include polyester. Embodiments also include load restraint strips in which a reinforcement layer comprises reinforcement fibers formed from one or more other materials (e.g., glass, polypropylene, carbon) and embodiments in which the number of fibers less than 100 or greater than 320.

In at least some embodiments, laminating adhesive 72(2) is an ethylene vinyl acetate water based copolymer adhesive having a viscosity between about 2900 centipoise (cps) and about 3200 cps. Embodiments include load restraint strips in which a laminating adhesive has a viscosity significantly outside this range and/or comprises a different type of adhesive.

Attachment layer 80(2) is fixed relative to reinforcement layer 70(2) and relative to base layer 60(2). Unlike reinforcement layer 70(2) and base layer 60(2), however, and as seen in FIGS. 5B and 5C, attachment layer 80(2) is confined to attachment region 27(2). In particular, attachment layer 80(2) may extend from side edge 28(2) to side edge 29(2) and from end edge 30(2) to a location a length $L_{AR}$ away from end edge 30(2). In the embodiment of load restraint strips 26, a container wall adhesive of attachment layer 80(2) comprises a first adhesive layer 81(2), a second adhesive layer 83(2) and a substrate layer 82(2). Substrate layer 82(2) at least partially separates adhesive layers 81(2) and 83(2). In some embodiments, however, substrate layer 82(2) may include holes or other perforations permitting direct contact between adhesive layers 81(2) and 83(2) in certain regions. Release paper liner 40(2) is affixed to the exterior side of adhesive layer 83(2). Liner 40(2) can be formed from, e.g., a paper product that is treated to resist the adhesive of layer 83(2). Such products include paper that has been coated or otherwise impregnated with wax, silicone or other non-stick material.

In at least some embodiments, adhesive layers 81(2) and 83(2) contain the same type of adhesive. In at least some such embodiments, adhesive layers 81(2) and 83(2) contain an acrylic adhesive having a shear strength of between about 50 psi and about 100 psi. Embodiments include load restraint strips in which an attachment layer adhesive has properties significantly outside this range and/or comprises a different type of adhesive. In some embodiments attachment layer 80(2) has a thickness of approximately 3 mils, although embodiments include load restraint strips with attachment layers having a substantially different thickness.

Substrate layer 82(2) may comprise a film of polyethylene terephthalate (PET) or other polymer and may have a thickness of between about 0.5 mils and about 1.0 mils. When a substrate layer is present, it may make little or no contribution to the load restraining strength of strip 26(2) and may simply serve as a carrier for adhesive layers 81(2) and 83(2). A substrate layer may not be present in some embodiments. In other embodiments, layers 81(2) and 83(2) may comprise different types of adhesives. For example, layer 83(2) may be a high shear strength pressure-sensitive acrylic adhesive that can accommodate a large temperature gradient, with layer 81(2) being an adhesive having higher shear and peel strengths than the adhesive of layer 83(2). In some such embodiments, the layer 81(2) adhesive could be a rubber based type of adhesive or could be an acrylic adhesive with a different formulation than the adhesive of layer 83(2).

As indicated above, each load restraint strip 26 may have a structure identical to that described above for load restraint strip 26(2). Accordingly, base layer 60(2), band 61(2), reinforcement layer 70(2), reinforcement fibers 71(2), laminating adhesive 72(2), attachment layer 80(2), first adhesive layer 81(2), substrate layer 82(2), second adhesive layer 83(2) and liner 40(2) of load restraint strip 26(2) may respectively be identical to base layers 60, bands 61, reinforcement layers 70, reinforcement fibers 71, laminating adhesives 72, attachment layers 80, first adhesive layers 81, substrate layers 82, second adhesive layers 83 and liners 40 of other load restraint strips 26.

Splice panel 35(1) includes a backing 36(1) and an adhesive 37(1). Adhesive 37(1) may be attached to the outer face of band 61(2) and, as discussed in more detail below in connection with FIG. 8B, to band 61(1) of load restraint strip 26(1). In at least some embodiments, adhesive 37(1) has a shear strength equal to or greater than the longitudinal tension in the manufacturing rewind process, has a peel strength allowing hand removal of splice panel 35(1) from load restraint strips 26(1) and 26(2) using moderate pulling force, leaves minimal residue on the regions of bands 61(1) and 61(2) exposed when splice panel 35(1) is removed, and causes little or no damage to those regions of bands 61(1) and 61(2). In some embodiments, backing 36(1) may be a polyethylene terephthalate (PET) film carrier having thickness between about 0.25 mils and about 3 mils, where 1 mil=0.001 inch. Adhesive 37(1) may be, e.g., a rubber- or acrylic-based pressure sensitive adhesive with a coat weight of between about 1 and about 4 mils.

As indicated above, each splice panel 35 may have a structure identical to that described above for splice panel 35(1). Accordingly, backing 36(1) and adhesive 37(1) of splice panel 35(1) may respectively be identical to backing 36 and adhesive 37 of other splice panels 35.

Figure 7A:
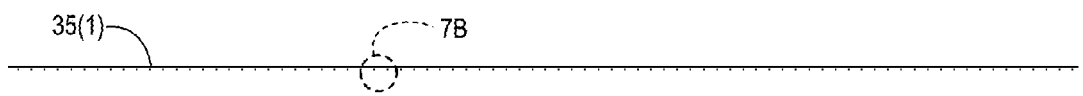
FIG. 7A is a partially schematic area cross-sectional view taken from the location indicated in FIG. 5B.
Figure 7B:
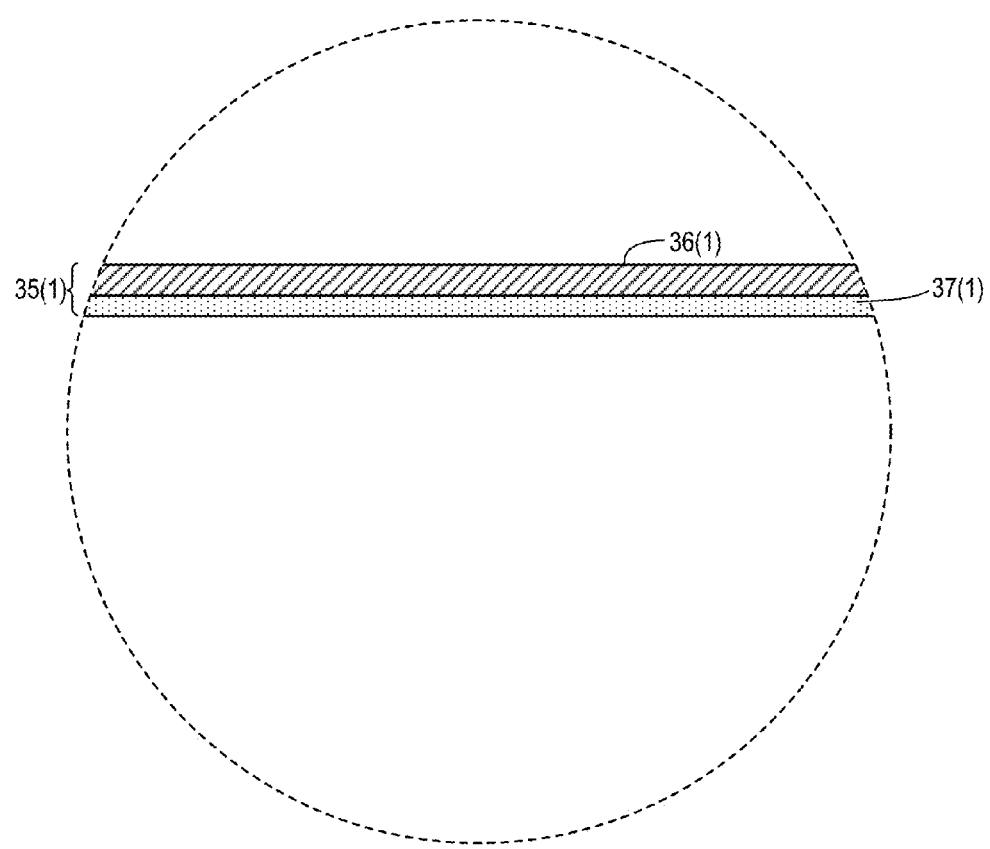
FIG. 7B is an enlargement of a part of the partially schematic area cross-sectional of FIG. 7A.

FIG. 7A is a partially schematic area cross-sectional view of splice panel 35(1) taken from the location indicated in FIG. 5B. The sectioning plane of FIG. 7A is located at the transition between adjacent load restraint strips 26(1) and 26(2). FIG. 7B is an enlargement of a part of that partially schematic area cross-sectional view from the location indicated in FIG. 7A. As seen in FIG. 7B, only backing 36(1) and adhesive 37(1) are present. Once splice panel 35(1) is pulled away, load restraint strip 26(1) may separate from load restraint strip 26(2). Cross sectional views taken at similar locations of between other load restraint strips 26 would show features like those in FIG. 7B.

Figure 8A:
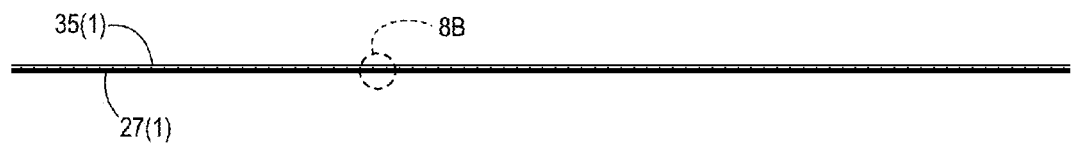
FIG. 8A is a partially schematic area cross-sectional view taken from the location indicated in FIG. 5B.
Figure 8B:
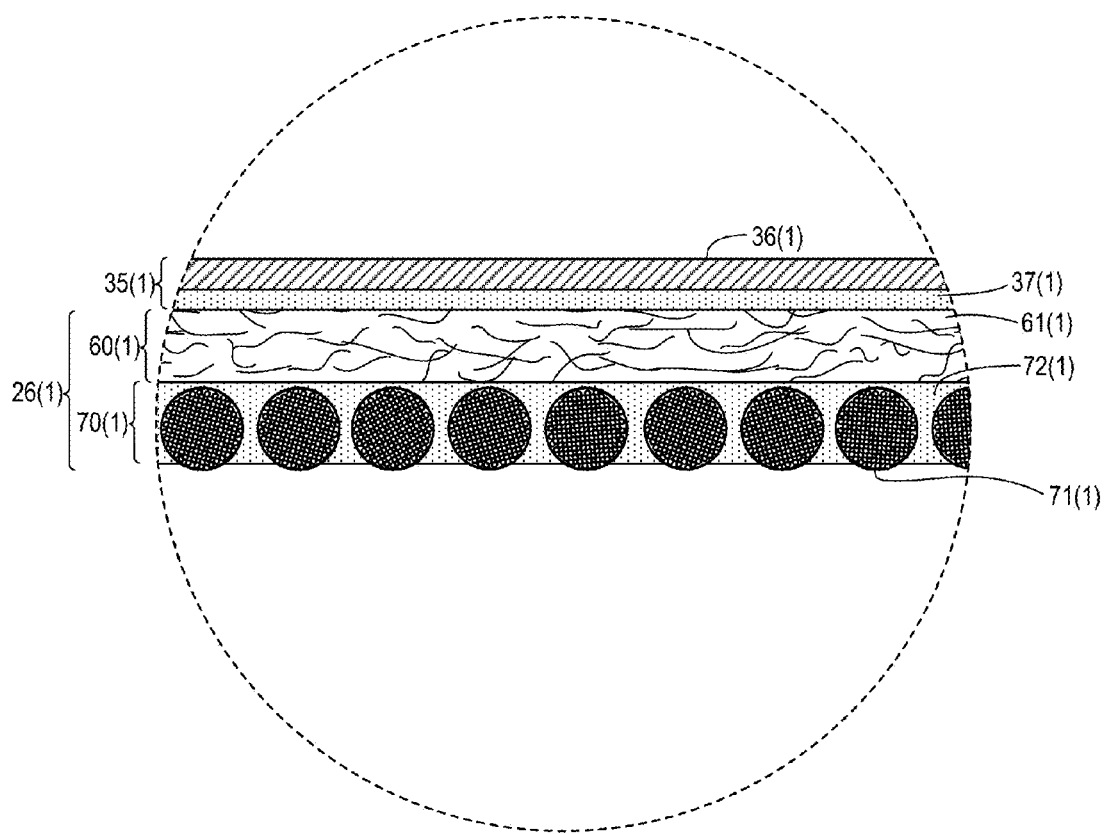
FIG. 8B is an enlargement of a part of the partially schematic area cross-sectional of FIG. 8A.

FIG. 8A is a partially schematic area cross-sectional view of load restraint strip 26(1) and splice panel 35(1) taken from the location indicated in FIG. 5B. FIG. 8B is an enlargement of a part of that partially schematic area cross-sectional view from the location indicated in FIG. 8A. Cross sectional views taken at similar locations of other load restraint strips 26 would show features like those in FIG. 8B. As seen in FIG. 8B, adhesive 37(1) of splice panel 35(1) is attached to the outer face of band 61(1) of base layer 60(1). Reinforcement layer 70(1), which includes reinforcement fibers 71(1) and laminating adhesive 72(1), is fixed relative to base layer 60(1). As seen by comparing FIG. 8B with FIGS. 5A through 5C, however, attachment region 27(1) is not located in the portion of load restraint strip 26(1) attached to splice panel 35(1).

In some embodiments, a splice panel 35 may have a different color than, or be otherwise visually distinguishable from, the surfaces of the load restraint strips 26 to which that splice panel 35 is adhered. In this manner, personnel using load restraint strips 26 to secure cargo can readily determine where one load restraint strip 26 ends and another load restraint strip 26 begins.

A set of detachably-spliced load restraint strips 26 can be manufactured using a production line and production process similar those used to produce existing types of load restraint strips, but modified to cut between ends 33 and 32 of adjacent load restraint strips 26 and apply a splice panel 35 across the severed ends. A continuous sheet of base layer material 61 and a parallel sets of continuous reinforcing fibers 71 may be bonded together in a conventional manner with laminating adhesive 72 to form a continuous web. That web may be advanced until a part of the web corresponding to an attachment region 27 reaches an attachment layer applicator, at which point web movement may be temporarily stopped. An attachment layer 80 may be applied to the stopped web in a conventional manner. While the web movement is stopped, and after an attachment layer 80 has been applied, a knife may slice the web at an edge of the just-applied attachment layer. A splice panel 35 may then be applied over the cut on a side of the web opposite the just-applied attachment layer 80. Movement of the web may then resume until a part of the web corresponding to the next attachment region 27 reaches the attachment layer applicator.

Further embodiments may include features in addition to or instead of features described thus far. For example, in some embodiments a load restraint strip may include a different type of reinforcement material. Examples of other types of reinforcement materials include cross-weave reinforcement such as is described in U.S. Pat. No. 7,329,074. Additional examples of other types of reinforcement materials include monolithic polymer sheets such as is described in U.S. Pat. No. 6,896,459.

Figure 9:
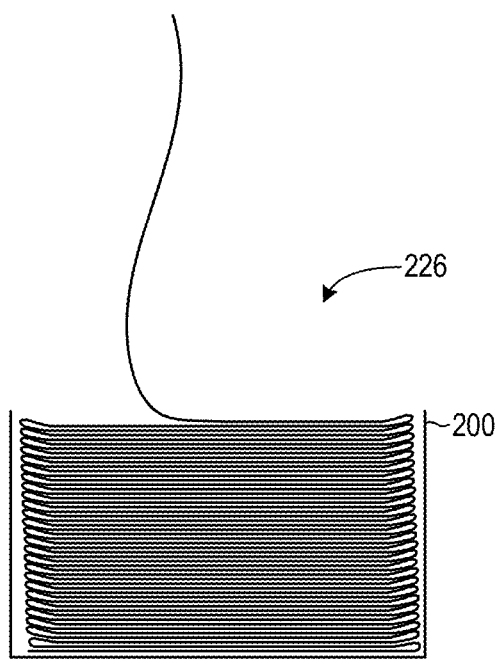
FIG. 9 is a partially schematic side view of a set of load restraint strips packaged in a box.

In some embodiments, a set of detachably-spliced load restraint strips may be packaged and/or arranged differently. For example, FIG. 9 is a partially schematic side view of a set of load restraint strips 226 packaged in a box 200. Load restraint strips 226 may be similar to load restraint strips 26 and be detachably spliced similar to load restraint strips 26. In the arrangement of FIG. 9, the load restraint strips 226 are laid in alternating layers instead of being would into a roll.

In some embodiments, a set of detachably-spliced load restraint strips may include strips of different lengths and/or may include load restraint strips having attachment regions of different lengths. A set of detachably-spliced load restraint strips could include load restraint strips having additional layers, e.g., additional layers of reinforcement and/or one or more layers to add coloration to one or more regions of a load restraint strip. In the embodiment of load restraint strips 26, opposite ends of load restraint strips are spliced. In particular, an end of a load restraint strip 26 without an attachment regions 27 is spliced to an end of another load restraint strip 26 with an attachment region. In some embodiments, like ends of load restraint strips may be spliced. For example, an end of a first load restraint strip having an attachment region may be spliced to an end of a second load restraint strip having an attachment region. The other end of the second load restraint strip may lack an attachment region and be spliced to an end of a third load restraint strip lacking an attachment region. This pattern could then continue.

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention.

The invention claimed is:

1. An article of manufacture comprising:
   a set of detachably-spliced load restraint strips, wherein each of the load restraint strips includes
      a base layer comprising a base layer material,
      a reinforcement layer comprising a fibrous reinforcing material fixed relative to the base layer material and discontinuous from the fibrous reinforcing materials of other ones of the load restraint strips, and
      an attachment layer comprising an adhesive material layer extending less than an entire length of the load restraint strip; and
   a plurality of splice panels, wherein each of the splice panels comprises a flexible backing and a releasable adhesive and joins a pair of the multiple load restraint strips different from pairs of the multiple load restraint strips joined by other splice panels of the plurality.

2. The article of manufacture of claim 1, wherein the base layer material of each of the load restraint strips is discontinuous from the base layer materials of the other load restraint strips.

3. The article of manufacture of claim 1, wherein
  each of the load restraint strips comprises first and second end edges separated by a length of the load restraint strip, first and second side edges extending between the first and second end edges and separated by a width of the load restraint strip less than the length of the load restraint strip, a first end proximate to and including the first end edge and a second end proximate to and including the second end edge, and
  each of the splice panels joins a pair of the multiple load restraint strips by joining one of the ends of one of the load restraint strips of that pair and one of the ends of the other load restraint strip of that pair.

4. The article of manufacture of claim 3, wherein, as to each of the load restraint strips, the attachment layer extends from the first end edge and does not extend to the second end.

5. The article of manufacture of claim 3, wherein the set of load restraint strips comprises at least ten load restraint strips and the plurality of splice panels comprises at least nine splice panels.

6. The article of manufacture of claim 3, wherein the length of each of the load restraint strips is between 9 and 13 feet, the width of each of the load restraint strips is between 10 and 18 inches, and the attachment layer of each of the load restraint strips extends a length of between 2 and 6 feet.

7. The article of manufacture of claim 6, wherein each of the splice panels has a length between 2.5 inches and 6 inches and a width approximately equal to the widths of the load restraint strips of the pair of load restraint strips joined by the splice panel.

8. The article of manufacture of claim 3 wherein, as to each of the load restraint strips, the fibrous reinforcing material extends from a first edge to a second edge.

9. The article of manufacture of claim 1, wherein each of the load restraint strips has a first side and a second side, the attachment layers of the load restraint strips are on the first sides, and the releasable adhesives of the splice panels are adhered to portions of the second sides.

10. An article of manufacture comprising:
  a set of load restraint strips, wherein each of the load restraint strips includes
    first and second end edges and first and second side edges extending between the first and second end edges,
    a base layer comprising a base layer material,
    a reinforcement layer comprising a fibrous reinforcing material, and
    an attachment layer comprising an adhesive material layer and release liner extending less than an entire length of the load restraint strip; and
  a plurality of splice panels, wherein
    each of the splice panels joins a pair of load restraint strips from the set,
    the pair of load restraint strips joined by each of the splice panels is different from each of pairs of the load restraint strips joined by other ones of the splice panels, and
    each of the splice panels comprises a flexible backing and a releasable adhesive contacting the pair of load restraint strips joined by that splice panel.

11. The article of manufacture of claim 10, wherein each of the splice panels extends across one of the end edges of each of the load restraint strips in the pair of load restraint strips joined by the splice panel.

12. The article of manufacture of claim 10, wherein the length of each of the load restraint strips is between 9 and 13 feet, a width of each of the load restraint strips is between 10 and 18 inches, and the attachment layer of each of the load restraint strips extends a length of between 2 and 6 feet.

13. The article of manufacture of claim 10, wherein, as to each of the load restraint strips, the fibrous reinforcing material extends from a first edge to a second edge.

14. The article of manufacture of claim 10, wherein the set of load restraint strips comprises at least ten load restraint strips and the plurality of splice panels comprises at least nine splice panels.

15. The article of manufacture of claim 10, wherein each of the load restraint strips has a first side and a second side, the attachment layers of the load restraint strips are on the first sides, and the splice panels are adhered to portions of the second sides.

16. An article of manufacture comprising:
  a set of load restraint strips, wherein each of the load restraint strips has a first side and a second side and includes
    a base layer comprising a base layer material,
    a reinforcement layer comprising a reinforcing material different from the base layer material, and
    an attachment layer comprising an adhesive material layer and release liner, the attachment layer extending less than an entire length of the load restraint strip, and located on the first side; and
  a plurality of splice panels, wherein each of the splice panels joins a pair of load restraint strips from the set, the pair of load restraint strips joined by each of the splice panels is different from each of pairs of the load restraint strips joined by other ones of the splice panels, and each of the splice panels comprises a flexible backing and a releasable adhesive contacting the second sides of the load restraint strips of the pair of load restraint strips joined by that splice panel.

17. The article of manufacture of claim 16, wherein the length of each of the load restraint strips is between 9 and 13 feet, a width of each of the load restraint strips is between 10 and 18 inches, and the attachment layer of each of the load restraint strips extends a length of between 2 and 6 feet.

18. The article of manufacture of claim 17, wherein each of the splice panels extends across an end edge of each of the load restraint strips in the pair of load restraint strips joined by the splice panel.

19. The article of manufacture of claim 18, wherein the set of load restraint strips comprises at least ten load restraint strips and the plurality of splice panels comprises at least nine splice panels.

20. The article of manufacture of claim 19, wherein each of the splice panels has a length between 2.5 inches and 6 inches and a width approximately equal to the widths of the load restraint strips of the pair of load restraint strips joined by the splice panel.

\* \* \* \* \*